Oct. 7, 1958 W. J. CASEY III 2,855,115
SYSTEM FOR TRANSFERRING VEHICLES TO RAIL CARS
Filed April 13, 1955 2 Sheets-Sheet 1
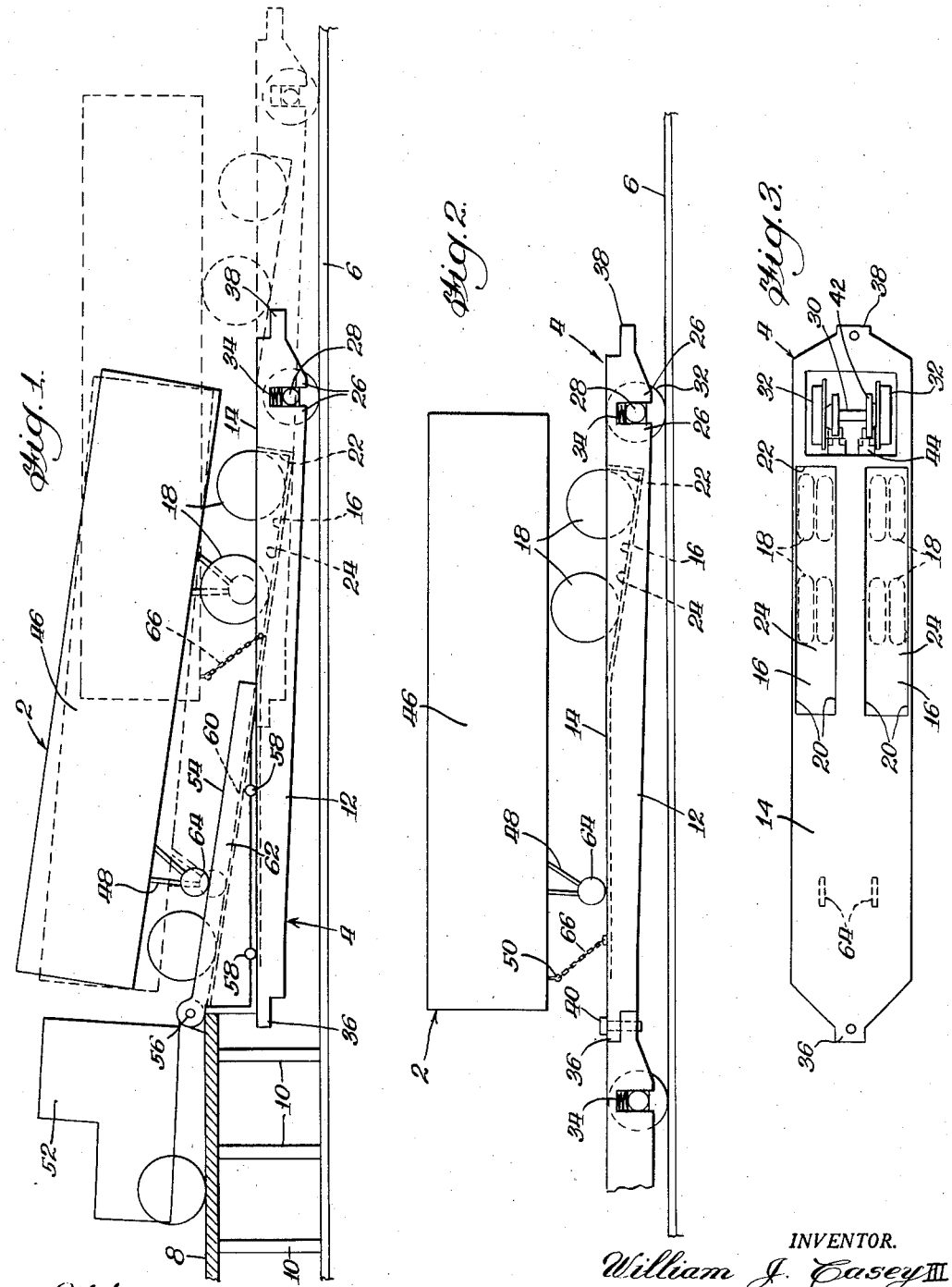
INVENTOR.
William J. Casey III
BY
Walter L. Schlegel, Jr. Atty.
Witness:
Chas H Barnard

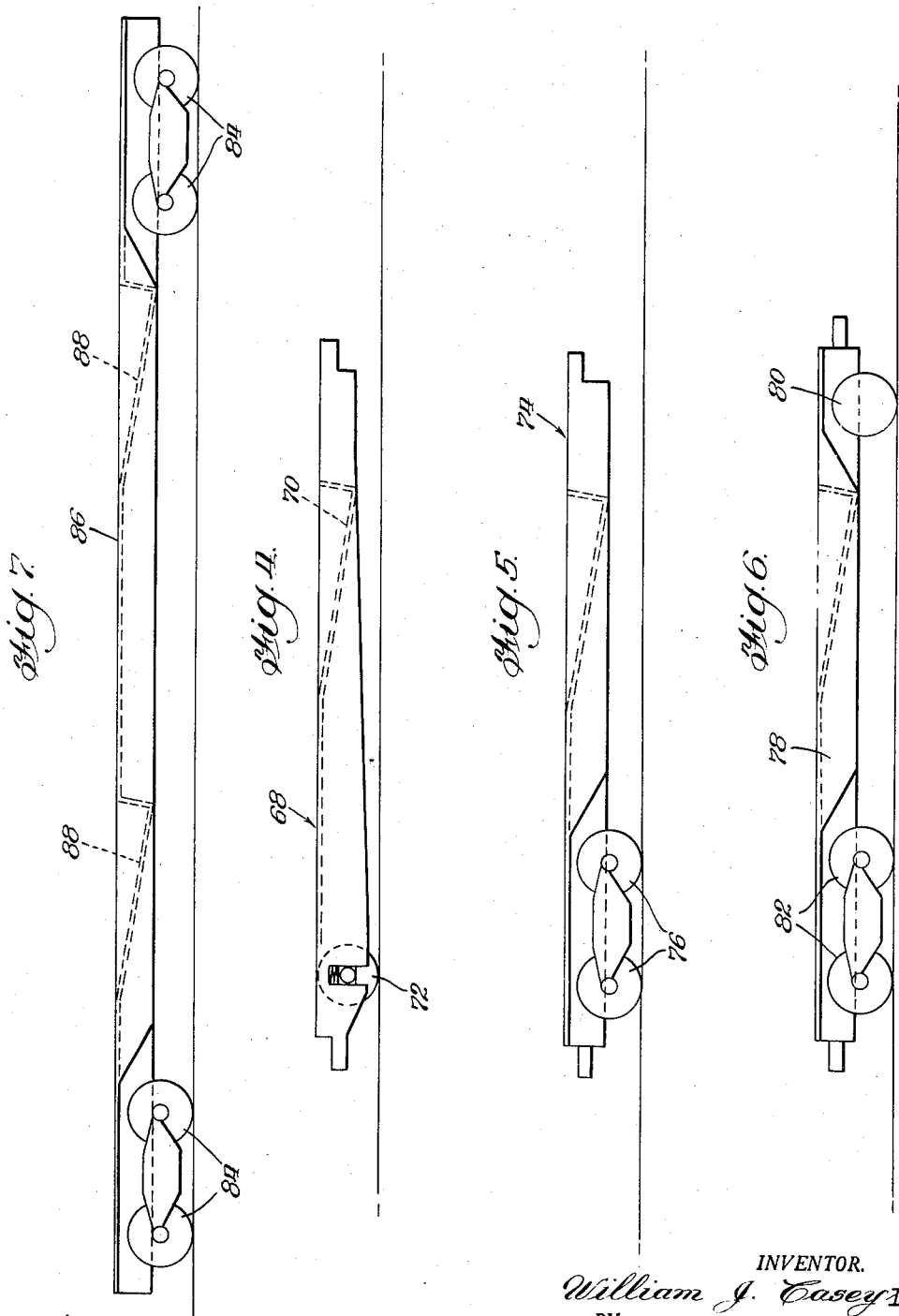

United States Patent Office 2,855,115
Patented Oct. 7, 1958

2,855,115

SYSTEM FOR TRANSFERRING VEHICLES TO RAIL CARS

William J. Casey III, Highland Park, Ill., assignor to American Steel Foundries, Chicago, Ill., a corporation of New Jersey Application April 13, 1955, Serial No. 501,082

10 Claims. (Cl. 214—38)

This invention relates to railway conveyances adapted for use in intercity transport of highway trailers, and is further concerned with the provision of a fast and relatively easy method for loading and unloading trailers onto and off of such conveyances.

Briefly, the present invention contemplates the provision of an elevated loading platform provided with a drawbridge-type ramp having wheels at its lower end for rolling engagement along the floor of a rail car movable along a lower level below the loading platform and ramp, the car floor being formed with wheel wells to receive the rear wheels of a highway trailer. The wheel wells are provided with runways adapted to first be positioned in registry with the ramp runway during loading of trailers from the loading platform to the rail car; after which, the car is moved away from the platform to cause the trailer landing gear wheels to move down the platform ramp runway onto the floor of the car. The trailer is then secured in fixed position on the car for transport to its destination.

An object of the invention resides in the provision of a system adapted to reduce the time and expense involved in transporting highway trailers on rail cars.

Another object of the invention resides in the provision of a system by which trailers may readily be mounted on or removed from rail cars.

A further object of the invention resides in the provision of a system which is relatively inexpensive in construction and reliable in use.

Another object of the invention resides in the provision of a system embodying a rail car formed with wells to receive the rear wheels of trailers, the wells being provided with runways for registry with a platform ramp runway during transfer of trailers between a platform and the rail car.

The invention embodies other novel features, details of construction and arrangement of parts which are hereinafter set forth in the specification and claims, and illustrated in the accompanying drawings, wherein:

Figure 1 is a schematic side elevational view illustrating the manner in which a highway trailer is moved onto or off of a rail car employed to transport the trailer.

Figure 2 is a schematic side elevational view showing the trailer secured in fixed position for transport on the rail car.

Figure 3 is a schematic top plan view showing the rail car, with the rear wheels of a trailer indicated in dotted outline within the wells provided on the car.

Figures 4, 5, 6 and 7 are schematic side elevational views illustrating modified forms of rail cars.

Referring now to the drawings for a better understanding of the invention and more particularly to Figures 1 to 3 therein, the system for transferring highway trailers 2 to rail cars 4 is shown as comprising railroad rails 6—6 extending below an elevated loading platform 8 supported by any suitable means such as columns 10 arranged along remote sides of the rails. It will be noted that the loading platform 8 is spaced from the tracks 6 to permit movement of conventional types of railway flat cars under the platform during loading and unloading of trailers onto and off of the cars.

In Figures 1 to 3 in the drawings, the rail car 4 is shown as comprising a suitable car frame 12 provided with a floor 14 having wells 16 to receive the rear wheels 18 of a trailer, each well 16 being defined by side walls 20—20, a back wall 22 and an inclined runway 24 extending from the floor downwardly to the back wall. One end of the car frame 12 is provided with pedestals 26—26 to receive anti-friction bearings 28 having the ends of an axle 30 journaled therein.

Flanged wheels 32—32 are secured on the axle 30 for rolling engagement along the rails 6—6, and helical compression springs 34 are interposed between the frame 12 and each bearing 28. The car frame 12 is provided with a front coupling tongue 36 and a rear coupling tongue 38, the front tongue being formed and arranged to rest upon the rear tongue of an adjacent car, as illustrated in Figure 2, and to be pivotally connected thereto by means of a coupling pin 40. To decelerate the rail car, rotors 42 may be secured to the axle 30 to be frictionally engaged by stators 44 mounted on the car frame 12.

The rail car 4 is adapted to receive and transport a conventional highway trailer 2 comprising a body 46 adapted to be supported upon its rear wheels 18 and a landing gear 48, the body being provided with the usual king pin 50 for detachable engagement with the conventional fifth wheel (not shown) on a highway tractor 52.

A ramp 54 is pivotally connected at 56 to one end of the loading platform 8 and has wheels or rollers 58 thereon for rolling engagement along the floor 14 of a rail car during loading and unloading operations. Suitable means (not shown) may be provided for raising or lowering the ramp. The ramp 54 is provided with an inclined runway 60 adapted to be disposed in registry with the car runways 24, and is also provided with side ledges 62—62 projecting inwardly from and extending along opposite sides of the runway 60.

To load a highway trailer 2 onto the rail car 4, the car is positioned to dispose the runways 24 in registry with the ramp runway 60, and the trailer is then moved down said runways by means of the tractor 52 to dispose the wheel 18 within the wells 16 and against the back wall 22. The landing gear wheels 64 are then lowered into engagement with the ramp runway 60 and the fifth wheel of the tractor 52 is disconnected from the trailer king pin 50 to permit the driver to move the tractor along the loading platform for engagement with another trailer to be transferred onto a rail car. The rail car 4 is then moved to cause the landing gear wheels 64 to move down the ramp runway 60 onto the car floor 14.

An anchor chain 66 is provided on the rail car for detachable engagement with the trailer king pin 50 to limit longitudinal movement of the trailer relative to the car. By following the procedure outlined above, it will be noted that all the cars in a train may be quickly loaded with trailers for transport to a distant place. Unloading of the trailers from the rail cars is accomplished by reversing the loading procedure just described.

Figure 4 illustrates a modified form of the invention in which a rail car 68 is provided with trailer wheel wells 70 located on the remote end of the car from the wheel and axle assembly 72. This form of the invention is otherwise similar to the form heretofore shown and described.

Figure 5 illustrates another modified form of the invention in which each rail car 74 is shown as provided at one end thereof with a conventional four wheel railway truck 76, the other end of the car being supported upon an adjacent car.

Figure 6 illustrates another form of the invention in which one end of the rail car frame 78 is supported on two wheels 80 and the other end of the frame is supported upon a four wheel truck 82.

Figure 7 illustrates another form of the invention in which four wheel trucks 84 are provided at opposite ends of a rail car 86 designed to transport two trailers, the car being provided with wells 88 to receive the rear wheels of the trailers.

In the several forms of the invention it will be noted that the rail car wells serve to maintain trailers in a substantially horizontal plane and against longitudinal or lateral movement relative to the rail car and also serve to lower the center of gravity of the loaded cars.

While the invention has been shown in several forms, it is obvious to those skilled in the art that it is not so limited but is susceptible of various changes and modifications without departing from the scope of the claimed invention.

I claim:

1. In a railway system for transporting conventional highway trailers of the type having a body provided with rear wheels, landing gear wheels and a king pin, a flat rail car having a floor at least as wide as the trailer for supporting the wheels of the trailer, an elevated loading platform, rails supporting said car for movement under said platform, a ramp extending from said platform to said car floor, said car floor being provided with a well longitudinally beyond the lower end of the ramp to receive the rear wheels of a trailer, and readily detachable means having one end thereof secured to said car floor, said means having the other end thereof secured to said king pin, the back wall limiting movement of the rear wheels down said runway, the side walls limiting transverse movement of the rear wheels with respect to the trailer, and said means limiting movement of the rear wheels up the runway.

2. In a railway system for transporting conventional highway trailers of the type having a body provided with rear wheels, landing gear wheels and a king pin, a flat rail car having a floor to support a trailer, an elevated loading platform, rails supporting said car for movement under said platform, and a ramp mounted on and extending from said platform to said car floor, said car floor being provided with a well to receive the rear wheels of a trailer, when said landing gear wheels are positioned on said ramp, whereby movement of said car relative to said platform moves the landing gear wheels down the ramp onto the car floor to complete the loading operation, said well permitting movement of the rear wheels towards the ramp, said well restricting movement of the rear wheels in all other directions.

3. A device of the class described comprising a loading platform having a ramp, rails running beneath said platform and ramp, a railway car with wheels supported by said rails, said car having a substantially horizontal surface at one end thereof underlying the ramp, said car having another surface inclined downwardly from the first mentioned surface towards the other end of the car, a surface on said ramp inclined downwardly towards said other end of the car and terminating at approximately the upper end of the inclined surface of the car, and means on said car to limit downward movement along said inclined surfaces of a trailer having wheels on the car inclined surface and having a wheel on the ramp inclined surface, whereby movement of the car and its inclined surface away from the ramp inclined surface causes the last mentioned wheel to ride down the ramp inclined surface and onto the first mentioned surface without substantial jarring of the trailer.

4. In a railway system for transporting conventional highway trailers of the type having a body provided with rear wheels, a landing gear wheel, and a king pin, a flat rail car having a floor to support a trailer, an elevated loading platform, means supporting said car for movement under said platform, and a ramp extending from said platform to said car floor, said ramp having an inclined runway, said car floor being provided with a well to receive the rear wheels of a trailer, said well having an inclined runway, said rear wheels engaging said last mentioned runway, said runways being longitudinally aligned and continuous and inclined at a similar angle to form a substantially continuous single runway, said well also comprising side walls and a back wall, said side walls precluding transverse movement of said rear wheels with respect to the flat car, said back wall engaging the rear wheels to limit downward movement of the rear wheels along said continuous single runway, said landing gear wheel engaging said ramp runway, said landing gear wheel being movable with respect to said ramp runway whereby movement of the flat car and its well runway away from the platform and ramp runway causes the landing gear wheel to roll down the ramp runway onto the floor of the flat car.

5. In a railway system for transporting conventional highway trailers of the type having a body provided with rear wheels at the rear end thereof and rollers at the front end thereof, a flat rail car having a floor to support a trailer, an elevated loading platform, rails supporting said car for movement under said platform, a ramp extending downwardly from said platform to said car floor, an inclined runway disposed on said ramp, and a well disposed in said car and having an inclined runway, said runways being in substantially continuous alignment, said well including means to limit downward movement of the rear wheels of a trailer down said runways, said means limiting transverse movement of said wheels with respect to said car, said rollers engaging said inclined runway of said ramp, said rollers being slidably movable down said ramp runway due to movement to said flat car away from said platform, said rollers being slidably movable up said ramp runway due to movement of said flat car towards said platform.

6. A method for loading a tractor-trailer having a landing gear wheel at the front end thereof and rear wheels at the rear end thereof onto a flat car carried on rails in substantial alignment with a platform disposed above the rails; the steps of: positioning a ramp secured to the platform onto a flat car, positioning an inclined surface of a well in the flat car in continuous alignment with an inclined surface of the ramp, positioning the rear wheels of the trailer onto the inclined surface of the ramp, moving the trailer down the inclined surface of the ramp and the well until the rear wheels of the trailer are positioned within the well of the flat car, lowering the landing gear wheel onto the inclined surface of the ramp, releasing the tractor from the trailer, and then moving the flat car away from the platform and ramp to roll the landing gear wheel down the inclined surface of the ramp onto the flat car.

7. A method for unloading a tractor-trailer having a landing gear wheel at the front end thereof and rear wheels at the rear end thereof from a flat car carried on rails in substantial alignment with a platform disposed above the rails; the steps of: moving the flat car towards the platform whereby a platform ramp having an inclined surface moves over the flat car to roll the landing gear wheel of the trailer onto the inclined surface of the ramp and to position an inclined surface of a well in the flat car in substantially continuous alignment with the inclined surface of the ramp, connecting a tractor to the trailer, raising the landing gear wheel of the trailer, and then moving the trailer by means of the tractor up the inclined surfaces of the well and the ramp onto the platform.

8. A method of loading a trailer onto a flat car comprising aligning surfaces of a ramp and the car inclined downwardly toward one end of the car, rolling the rear wheels of the trailer down the ramp surface onto the car surface and limiting further downward movement of the wheels along the car surface, lowering a landing gear of the trailer to engage the ramp surface, and moving said end of the car away from the ramp surface until the landing gear is supported entirely by the car.

9. In a railway system for transporting conventional highway trailers of the type having a body provided with rear wheels, landing gear wheels and a king pin, a rail car having a substantially flat surface at one end thereof and an inclined surface at the other end thereof, an elevated loading platform remote from said inclined surface, means supporting said car for movement under said platform, a ramp having an inclined surface extending downwardly from the upper surface of the platform and terminating at the upper end of said car inclined surface, said inclined surfaces being longitudinally aligned with each other at a similar angle, said car inclined surface receiving the rear wheels of a highway trailer, said ramp inclined surface receiving the landing gear wheels of said trailer, and means at the lower end of said car inclined surface engaging the rear wheels of said trailer to limit movement of said rear wheels down said car inclined surface, whereby movement of said car inclined surface away from said ramp inclined surface causes the landing gear wheels to roll down the ramp inclined surface onto said flat surface.

10. In a railway system for transporting conventional highway trailers of the type having a body provided with rear wheels, landing gear wheels and a king pin, a rail car having a horizontal floor provided with a wheel well, said well having an inclined surface extending downwardly from said floor, means supporting said car, a loading platform disposed above said car, a ramp having an inclined surface extending downwardly from said platform to said first-mentioned surface and in continuous alignment therewith, said well receiving the rear wheels of a highway trailer, said landing gear wheels engaging the ramp surface, means on said ramp limiting transverse movement of the landing gear wheels, means in said well limiting transverse movement of said rear wheels, said last-mentioned means limiting movement of said rear wheels down the well inclined surface, whereby movement of said well away from said ramp and platform causes said landing gear wheels to roll down the ramp surface onto the horizontal floor, and means interconnecting the king pin and horizontal floor to limit movement of said rear wheels up the well surface.

References Cited in the file of this patent

UNITED STATES PATENTS

| | | |
|---|---|---|
| 1,499,971 | Callison | July 1, 1924 |
| 1,567,346 | Tunison et al. | Dec. 29, 1925 |
| 2,118,364 | Sheehan | May 24, 1938 |
| 2,159,479 | Goodwin et al. | May 23, 1939 |
| 2,274,471 | Breer | Feb. 24, 1942 |
| 2,305,444 | Pond | Dec. 15, 1942 |
| 2,405,833 | Johnston | Aug. 13, 1946 |
| 2,424,292 | Watkins et al. | July 22, 1947 |
| 2,708,887 | Van Alstine | May 24, 1955 |

FOREIGN PATENTS

| | | |
|---|---|---|
| 285,052 | Germany | June 18, 1915 |